United States Patent
Kanai et al.

(10) Patent No.: US 11,223,051 B2
(45) Date of Patent: Jan. 11, 2022

(54) LAMINATED CATALYST, ELECTRODE, MEMBRANE ELECTRODE ASSEMBLY, ELECTROCHEMICAL CELL, STACK, FUEL CELL AND WATER ELECTROLYSIS REVERSIBLE DEVICE, VEHICLE, AND FLYING OBJECT

(71) Applicant: KABUSHIKI KAISHA TOSHIBA, Minato-ku (JP)

(72) Inventors: Yuta Kanai, Meguro (JP); Norihiro Yoshinaga, Yokohama (JP); Taishi Fukazawa, Kawasaki (JP); Wu Mei, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 16/800,997

(22) Filed: Feb. 25, 2020

(65) Prior Publication Data
US 2021/0083300 A1  Mar. 18, 2021

(30) Foreign Application Priority Data
Sep. 18, 2019  (JP) .............................. JP2019-169521

(51) Int. Cl.
*H01M 4/90* (2006.01)
*H01M 8/1004* (2016.01)
*H01M 4/92* (2006.01)

(52) U.S. Cl.
CPC ......... *H01M 4/9058* (2013.01); *H01M 4/921* (2013.01); *H01M 8/1004* (2013.01); *H01M 2250/20* (2013.01)

(58) Field of Classification Search
CPC .. H01M 4/9058; H01M 8/1004; H01M 4/921; H01M 2250/20
See application file for complete search history.

(56) References Cited

U.S. PATENT DOCUMENTS

| 2012/0202683 | A1* | 8/2012 | Shirvanian | B01J 23/46 502/339 |
| 2012/0251915 | A1* | 10/2012 | Mei | H01M 4/8605 429/479 |
| 2014/0246304 | A1 | 9/2014 | Debe et al. | |
| 2015/0132683 | A1* | 5/2015 | Shirvanian | H01M 4/8657 429/528 |
| 2015/0311536 | A1* | 10/2015 | Atanasoska | H01M 4/8605 429/526 |

(Continued)

FOREIGN PATENT DOCUMENTS

| JP | 4977911 B2 | 7/2012 |
| JP | 2015-501374 A | 1/2015 |

(Continued)

*Primary Examiner* — Michael L Dignan
(74) *Attorney, Agent, or Firm* — Oblon, McClelland, Maier & Neustadt, L.L.P.

(57) ABSTRACT

According to an embodiment, a laminated catalyst includes a first catalyst layer mainly including a noble metal mainly containing Pt, a second catalyst layer mainly including a mixture of an oxide of a noble metal mainly containing Ir and Ru and a noble metal mainly containing Pt, and a third catalyst layer mainly including an oxide of a noble metal mainly containing Ir and Ru The first catalyst layer, the second catalyst layer, and the third catalyst layer are laminated in order.

18 Claims, 11 Drawing Sheets

(56) References Cited

U.S. PATENT DOCUMENTS

| | | | | |
|---|---|---|---|---|
| 2016/0087282 A1* | 3/2016 | Mei | ............. | H01M 4/8621 |
| | | | | 429/482 |
| 2016/0301081 A1* | 10/2016 | Mei | ............. | H01M 4/8817 |
| 2017/0077539 A1* | 3/2017 | Mei | ............. | H01M 8/1004 |

FOREIGN PATENT DOCUMENTS

| JP | 5676334 B2 | 2/2015 |
|---|---|---|
| JP | 2017-41379 A | 2/2017 |

* cited by examiner

LAMINATED CATALYST, ELECTRODE, MEMBRANE ELECTRODE ASSEMBLY, ELECTROCHEMICAL CELL, STACK, FUEL CELL AND WATER ELECTROLYSIS REVERSIBLE DEVICE, VEHICLE, AND FLYING OBJECT

CROSS-REFERENCE TO RELATED APPLICATION

This application is based upon and claims the benefit of priority from Japanese Patent Application No. 2019-169521, filed on Sep. 18, 2019; the entire contents of which are incorporated herein by reference.

FIELD

Embodiments described herein relate to a laminated catalyst, an electrode, a membrane electrode assembly, an electrochemical cell, a stack, a fuel cell and water electrolysis reversible device, a vehicle, and a flying object.

BACKGROUND

In recent years, electrochemical cells have been actively studied. Among electrochemical cells, for example, a polymer electrolyte water electrolysis cell (PEMEC: Polymer Electrolyte Membrane Electrolysis Cell) is expected to be used for hydrogen generation in a large-scale energy storage system. In order to ensure sufficient durability and electrolytic properties, platinum (Pt) nanoparticle catalysts are generally used for PEMEC cathodes, and noble metal catalysts such as iridium (Ir) nanoparticle catalysts are used for positive electrodes.

In addition, a fuel cell uses an electrochemical cell that generates electricity by electrochemically reacting a fuel such as hydrogen with an oxidant such as oxygen. Among them, a polymer electrolyte fuel cell (PEFC: Polymer Electrolyte Membrane Fuel Cell) has been put to practical use as a stationary power source for homes or a power source for automobiles because of its low environmental load. A platinum (Pt) nanoparticle catalyst is generally used for a fuel electrode and an oxygen electrode of PEFC.

DETAILED DESCRIPTION

According to an embodiment, a laminated catalyst includes a first catalyst layer mainly including a noble metal mainly containing Pt, a second catalyst layer mainly including a mixture of an oxide of a noble metal mainly containing Ir and Ru and a noble metal mainly containing Pt, and a third catalyst layer mainly including an oxide of a noble metal mainly containing Ir and Ru The first catalyst layer, the second catalyst layer, and the third catalyst layer are laminated in order.

Hereinafter, embodiments of the present invention will be described in detail with reference to the drawings.

In the following description, same members are denoted by same reference signs, and description of such as members once described is omitted as appropriate.

First Embodiment

Figure 1:
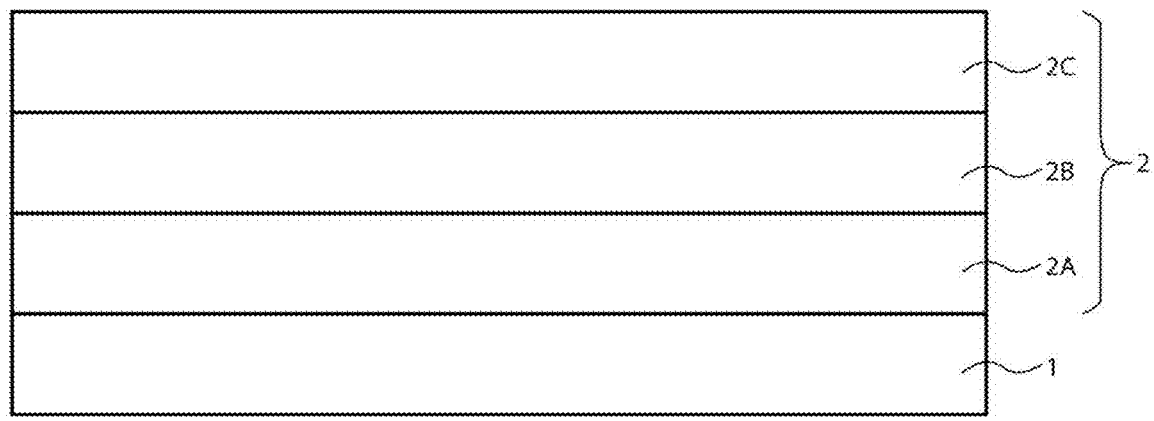
FIG. 1 is a conceptual diagram of an electrode according to an embodiment.

The first embodiment relates to an electrode. FIG. 1 is a conceptual diagram of an electrode 100 according to an embodiment of the present invention. The electrode 100 includes a substrate 1 and a laminated catalyst 2. In the embodiment, the laminated catalyst 2 is used as a catalyst in an electrode reaction of a fuel cell and water electrolysis.

The electrode 100 of the first embodiment is used as an anode for water electrolysis and is preferably used as an oxygen electrode of a fuel cell. The electrode of the first embodiment can also be used as a water electrolysis cathode and a fuel electrode of a fuel cell.

As the substrate 1, it is preferable to use a material having high porosity and conductivity. Since the electrode 100 is also used as a positive electrode of a water electrolysis cell, a highly durable titanium (Ti) material is used, and for example, a cloth made of Ti mesh and Ti fiber, a Ti sintered body, or the like is used. The substrate 1 is porous so as to pass through gas or liquid. The porosity of the substrate 1 may be equal to or more than 20% and equal to or less than 95%, more preferably equal to or more than 40% and equal to or less than 90%, considering the movement of a substance. For example, when the substrate 1 is a metal nonwoven fabric in which metal fibers are entangled, the fiber diameter is preferably equal to or more than 1 μm and equal to or less than 500 μm, and more preferably equal to or more than 1 μm and equal to or less than 100 μm in consideration of reactivity and power supply. When the substrate 1 is a particle sintered body, a particle diameter is preferably equal to or more than 1 μm and equal to or less than 500 μm, and more preferably equal to or more than 1 μm and equal to or less than 100 μm in consideration of reactivity and power supply.

A coating layer may be provided on the substrate 1. The durability of the electrode 100 is improved by a conductive dense coating layer. Although the coating layer is not specifically limited, a metal material, a ceramic material such as an oxide and nitride, carbon, and the like can be used. In the coating layer, a multi-layer structure or a gradient structure made of different materials can be formed to further enhance durability. When Ti is used for the substrate 1, an oxide containing Ir having a thickness of equal to or more than 10 nm is particularly effective as the coating layer. It is considered that a dense composite oxide layer of Ir and Ti is formed on the coating layer.

The substrate 1 preferably contains a water repellent. The water repellent, for example, increases the water repellency of the substrate 1 and prevents a flooding phenomenon. Examples of the water repellent include fluorine-based polymer materials such as polytetrafluoroethylene (PTFE), polyvinylidene fluoride (PVDF), polyhexafluoropropylene, and tetrafluoroethylene-hexafluoropropylene copolymer (FEP). In the case of PEFC, the water repellency (weight percent of a water repellent in a gas diffusion layer) is generally preferably equal to or more than 2% by weight and equal to or less than 30% by weight. A moisture management layer (MPL) may be further provided on the laminated catalyst 2 side of the substrate 1. The moisture management layer (not illustrated) is, for example, a water-repellent porous layer containing a water-repellent material and a conductive material or a hydrophilic porous layer containing a hydrophilic material and a conductive material.

The laminated catalyst 2 includes a first catalyst layer 2A, a second catalyst layer 2B, and a third catalyst layer 2C. In the laminated catalyst 2, the first catalyst layer 2A, the second catalyst layer 2B, and the third catalyst layer 2C are laminated in order. The first catalyst layer 2A or the third catalyst layer 2C is located on the substrate 1 side. The substrate 1 is preferably in direct contact with the first catalyst layer 2A or the third catalyst layer 2C.

When the first catalyst layer 2A is located on the substrate 1 side, the third catalyst layer 2C is located on the surface side of the electrode 100 (side in contact with an electrolyte membrane). At this time, a surface of the first catalyst layer 2A facing the substrate 1 side is in contact with a surface of the substrate 1 facing the first catalyst layer 2A. Further, at this time, it is preferable that the entire surface of the first catalyst layer 2A facing the substrate 1 side is in contact with the entire surface of the substrate 1 facing the first catalyst layer 2A.

When the third catalyst layer 2C is located on the gas diffusion layer 1 side, the first catalyst layer 2A is located on the electrode surface side (side in contact with the electrolyte membrane). At this time, a surface of the third catalyst layer 2C facing the substrate 1 is in contact with a surface of the substrate 1 facing the third catalyst layer 2C. Further, at this time, it is preferable that the entire surface of the third catalyst layer 2C facing the substrate 1 side is in contact with the entire surface of the third catalyst layer 2C facing the substrate 1 side.

The first catalyst layer 2A mainly includes a noble metal mainly containing Pt. The first catalyst layer 2A is a porous layer containing a Pt metal or/and an alloy containing Pt. The first catalyst layer 2A is a catalyst layer mainly including a non-oxide metal, and has excellent catalytic ability as a catalyst for a fuel cell. In the first catalyst layer 2A, a total amount of the Pt metal and the alloy containing Pt is preferably equal to or more than 90% by mass. In some cases, a Pt metal and an alloy containing Pt may be included, but if a large amount of metal other than oxide or Pt is included, the characteristics of the fuel cell of the electrode 100 deteriorate. Therefore, it is more preferable that the concentration of Pt with respect to the sum of the concentrations of Pt, Ir, and Ru contained in the first catalyst layer 2A is equal to or more than 90 atom %.

The first catalyst layer 2A preferably has a porous structure in which a sheet-like carrierless catalyst layer mainly containing Pt and a void layer are laminated, and/or a porous structure in which metal carrierless particles mainly containing Pt are aggregated. Therefore, the first catalyst layer 2A may be provided with either or both of a porous structure in which a sheet-like carrierless catalyst layer and a void layer are laminated and a porous structure in which carrierless particles are aggregated.

The first catalyst layer 2A may include at least one metal, other than Pt, selected from the group consisting of Co, Ni, Fe, Mn, Ta, W, Hf, Si, Mo, Ti, Zr, Nb, V, Cr, Al, and Sn. These metals are preferably included in the first catalyst layer 2A as a simple substance or an alloy with Pt.

Considering characteristics as a fuel cell, a thickness of the first catalyst layer 2A is preferably equal to or more than 100 nm. From the same viewpoint, the mass of Pt per area of the first catalyst layer 2A is preferably equal to or more than 0.02 mg/cm$^2$. More preferably, it is equal to or more than 0.05 mg/cm$^2$. Further, in consideration of smoothly supplying oxygen and discharging water, the thickness of the first catalyst layer 2A is preferably equal to or more than 200 nm and equal to or less than 2000 nm. A sum of the masses can be measured, for example, by inductively coupled plasma-mass spectrometry (ICP-MS). The mass of such Pt is somewhat reduced by using it as a fuel cell or as a water electrolysis device, but not so much that the characteristics are deteriorated.

The first catalyst layer 2A may contain equal to or less than 5% by mass of additives such as a hydrophilic material and a hydrophobic material.

The second catalyst layer 2B mainly includes a mixture of a noble metal oxide mainly containing Ir and Ru and a noble metal mainly containing Pt. The second catalyst layer 2B is a porous layer containing a Pt metal or/and an alloy containing Pt and a metal oxide containing Ir and Ru. The second catalyst layer 2B is a catalyst layer mainly including metal and oxide. In the second catalyst layer 2B, the total amount of a Pt metal, an alloy containing Pt, an Ir oxide, an Ru oxide, and a composite oxide of Ir and Ru is preferably equal to or more than 90% by mass. The Ir oxide, the Ru oxide, or the composite oxide of Ir and Ru may contain Ir or/and Ru and a metal other than Ir and Ru. The second catalyst layer 2B has a catalyst that functions in both the fuel cell and water electrolysis. When a catalyst that does not contribute to either fuel cell or water electrolysis is included, the performance per volume is lowered. From the above viewpoint, it is preferable that the sum of the concentrations of Pt, Ir, and Ru among the metals contained in the second catalyst layer 2B is equal to or more than 90 atom %.

The second catalyst layer 2B has a porous structure in which a sheet-like carrierless catalyst layer mainly containing Pt and a void layer are laminated and/or a porous structure in which metal carrierless particles mainly containing Pt are aggregated, and a porous structure in which a carrierless catalyst layer that is a sheet-like oxide mainly containing Ir and Ru and a void layer are laminated and/or a porous structure in which carrierless particles that are oxide mainly containing Ir and Ru are aggregated. Even when mainly containing Pt or mainly containing Ir and Ru, the second catalyst layer 2B may be provided with either or both of a porous structure in which a sheet-like carrierless catalyst layer and a void layer are laminated and a porous structure in which carrierless particles are aggregated.

Since the second catalyst layer 2B has characteristics between the first catalyst layer 2A and the third catalyst layer 2C, it is preferable that the concentration of Pt with respect to the sum of the concentrations of Pt, Ir and Ru contained in the second catalyst layer 2B is less than 90 atom %, and the sum of the concentrations of Ir and Ru with respect to the sum of the concentrations of Pt, Ir and Ru contained in the second catalyst layer 2B is less than 90 atom %. The second catalyst layer 2B is also preferable in that it does not hinder material transport between the first catalyst layer 2A and the third catalyst layer 2C.

The second catalyst layer 2B may include at least one metal, other than Pt, selected from the group consisting of Co, Ni, Fe, Mn, Ta, W, Hf, Si, Mo, Ti, Zr, Nb, V, Cr, Al, and Sn. These metals are preferably contained in the second catalyst layer 2B as a simple substance or an alloy with Pt.

In addition to oxides of Ir and Ru, the second catalyst layer 2B may include at least one metal oxide selected from the group consisting of Rh, Au, Ta, W, Si, Ti, Zr, Sn, Pt, Pd, Hf, V, Mo, Cr, Co, Ni, Nb, Fe, Mn, Al, and Zn. These metals are preferably contained in the second catalyst layer 2B as a composite oxide with Ir or/and Ru.

Since the second catalyst layer 2B contains both a metal (metal which mainly includes the first catalyst layer 2A) and an oxide (oxide which mainly includes the third catalyst layer 2C), affinity with the first catalyst layer 2A and the third catalyst layer 2C is high, and peeling between the catalyst layers hardly occurs, which contributes to improvement in durability.

When the catalyst layer only include the second catalyst layer 2B, the characteristics of both the fuel cell and the water electrolysis are deteriorated as compared with the laminated catalyst 2 of the embodiment even if the same amount of oxides of Pt, Ir, and Ru are included. By including both metal-based and oxide-based as in the second catalyst layer 2B, because it is difficult to form a complex network effective for supplying and discharging oxygen and for supplying and discharging water to/from the catalyst by a metal-based simple substance, and also it is difficult to form a complex network effective for supplying and discharging oxygen and for supplying and discharging water to/from the catalyst by an oxide-based simple substance, even if the second catalyst layer 2B has the same porous structure as the first catalyst layer 2A and the third catalyst layer 2C, it is inferred that the characteristics of both the fuel cell and water electrolysis are not high for the amount of catalyst.

In order to enjoy the advantages of the second catalyst layer 2B described above, the thickness of the second catalyst layer 2B is preferably equal to or more than 4 nm. If the second catalyst layer 2B is too thick, the performance of the fuel cell and water electrolysis per volume of the electrode 100 deteriorates. Therefore, the thickness of the second catalyst layer 2B is preferably equal to or more than 4 nm and equal to or less than 200 nm.

The second catalyst layer 2B may contain equal to or less than 5% by mass of additives such as a hydrophilic material and a hydrophobic material.

The third catalyst layer 2C mainly includes an oxide of a noble metal mainly containing Ir and Ru. The third catalyst layer 2C is a porous layer containing a metal oxide containing Ir and Ru. The third catalyst layer 2C is a catalyst layer mainly composed of a metal oxide and has excellent catalytic ability as a catalyst for water electrolysis. In the third catalyst layer 2C, the total amount of an Ir oxide, an Ru oxide, and a composite oxide of Ir and Ru is preferably equal to or more than 90% by mass. The Ir oxide, the Ru oxide, or the composite oxide of Ir and Ru may contain Ir or/and Ru and a metal other than Ir and Ru. If a large amount other than these oxides is contained, the water electrolysis characteristics of the electrode 100 will deteriorate. Therefore, it is more preferable that the sum of the concentrations of Ir and Ru with respect to the sum of the concentrations of Pt, Ir, and Ru contained in the third catalyst layer 2C is equal to or more than 90 atom %.

The third catalyst layer 2C preferably has a porous structure in which a carrierless catalyst layer that is a sheet-like oxide mainly containing Ir and Ru and a void layer are laminated, and/or a porous structure in which carrierless particles that is an oxide mainly containing Ir and Ru are aggregated. Either or both of a porous structure in which a sheet-like carrierless catalyst layer and a void layer are laminated and a porous structure in which carrierless particles are aggregated may be provided.

Considering characteristics as water electrolysis, the thickness of the third catalyst layer 2C is preferably equal to or more than 100 nm. From the same point of view, Ir and Ru per area of the third catalyst layer 2C are preferably equal to or more than $0.02$ mg/cm$^2$. More preferably, it is equal to or more than $0.05$ mg/cm$^2$. This sum of masses can be measured by ICP-MS. The mass of such Ir and Ru is somewhat reduced by using it as a fuel cell or as a water electrolysis device, but not so much that the characteristics are deteriorated. Further, in consideration of smoothly supplying water and discharging oxygen, the thickness of the third catalyst layer 2C is preferably equal to or more than 200 nm and equal to or less than 2000 nm.

The third catalyst layer 2C may contain equal to or less than 5% by mass of additives such as hydrophilic materials and hydrophobic materials.

The first catalyst layer 2A and the second catalyst layer 2B are preferably in contact, and more preferably in direct contact. A surface of the first catalyst layer 2A facing the second catalyst layer 2B is preferably in contact with a surface of the second catalyst layer 2B facing the first catalyst layer 2A. The surface of the first catalyst layer 2A facing the second catalyst layer 2B is preferably in direct contact with the surface of the second catalyst layer 2B facing the first catalyst layer 2A. The entire surface of the first catalyst layer 2A facing the second catalyst layer 2B is preferably in contact with the entire surface of the second catalyst layer 2B facing the first catalyst layer 2A. The entire surface of the first catalyst layer 2A facing the second catalyst layer 2B is preferably in direct contact with the entire surface of the second catalyst layer 2B facing the first catalyst layer 2A.

The second catalyst layer 2B and the third catalyst layer 2C are preferably in contact, and more preferably in direct contact. A surface of the second catalyst layer 2B facing the third catalyst layer 2C is preferably in contact with a surface of the third catalyst layer 2C facing the second catalyst layer 2B. The surface of the second catalyst layer 2B facing the third catalyst layer 2C is preferably in direct contact with the surface of the third catalyst layer 2C facing the second catalyst layer 2B. The entire surface of the second catalyst layer 2B facing the third catalyst layer 2C is preferably in contact with the entire surface of the third catalyst layer 2C facing the second catalyst layer 2B. The entire surface of the second catalyst layer 2B facing the third catalyst layer 2C is preferably in direct contact with the entire surface of the third catalyst layer 2C facing the second catalyst layer 2B.

Each one layer of the first catalyst layer 2A, the second catalyst layer 2B, and the third catalyst layer 2C is preferably included. For example, when five layers of the first catalyst layer 2A, the second catalyst layer 2B, the third catalyst layer 2C, the second catalyst layer 2B, and the first catalyst layer 2A are laminated in this order, it is difficult to transport materials in the laminated catalyst 2. In addition, even if the structure becomes complicated, the catalyst performance is not particularly improved, and therefore it is more preferable that the laminated catalyst 2 includes a single first catalyst layer 2A, a single second catalyst layer 2B, and a single third catalyst layer 2C. Further, as illustrated in FIG. 1, it is preferable that the first catalyst layer 2A, the second catalyst layer 2B, and the third catalyst layer 2C, which do not include an intermediate layer between layers, are each sequentially laminated.

The ratio of the second catalyst layer 2B to the thickness of the first catalyst layer 2A and the third catalyst layer 2C ([thickness $T_B$ of second catalyst layer 2B]/([thickness $T_A$ of first catalyst layer 2A]+[thickness $T_C$ of third catalyst layer 2C]) is preferably equal to or more than 1/300 and equal to or less than 1/5. That is, $T_A$, $T_B$, and $T_C$ preferably satisfy the relationship $1/300 \leq (T_B/(T_A+T_C)) \leq 1/5$. By being in this range, good characteristics can be obtained in both water electrolysis and a fuel cell, and since the ratio of the thickness of the second catalyst layer 2B is sufficient, effects such as durability due to the second catalyst layer 2B are obtained. [Thickness $T_B$ of second catalyst layer 2B]/([thickness $T_A$ of first catalyst layer 2A]+[thickness $T_C$ of third catalyst layer 2C] is more preferably equal to or more than 1/100 and equal to or less than 1/10. The ratio of thickness of the first catalyst layer 1A and the third catalyst layer 2C ([thickness $T_A$ of first catalyst layer 2A]/[thickness $T_C$ of third catalyst layer 2C]) is selected according to the balance between the characteristics of water electrolysis and a fuel cell, and is preferably equal to or more than 1/5 and equal to or less than 5 in consideration of both characteristics of water electrolysis and a fuel cell.

In the electrode according to the present embodiment, when the characteristics as a fuel cell are taken into consideration, it is preferable that the first catalyst layer 2A faces the substrate 1 side because oxygen supply to the catalyst and water discharge are performed smoothly. Considering the characteristics as water electrolysis, it is preferable that the third catalyst layer 2C faces the substrate 1 side because water supply and oxygen discharge are performed smoothly.

Thus, by providing the laminated catalyst 2 according to the present embodiment, it is possible to achieve both excellent characteristics in water electrolysis and fuel cells.

The catalyst layer included in the laminated catalyst 2 is a porous catalyst layer including a plurality of catalyst units. The catalyst unit is a carrierless catalyst that does not include a carrier. To obtain high cell characteristics, a catalyst layer to be used generally in an electrochemical cell includes a supported catalyst in which a catalyst is supported on a surface thereof by using a material such as carbon as a carrier. It has been reported that, although the carrier material hardly contributes to main electrocatalytic reaction, a catalyst material can be controlled for improvement of a reaction area of the catalyst material, and also a pore structure, electric conductivity, ion conductivity and the like can be improved by an electrochemical cell. Carrierless means that a carrier is not used for a catalyst included in a catalyst layer. This catalyst layer preferably includes a catalyst unit having a porous structure in which particles are aggregated or a laminated structure including a void layer.

Figure 2A:
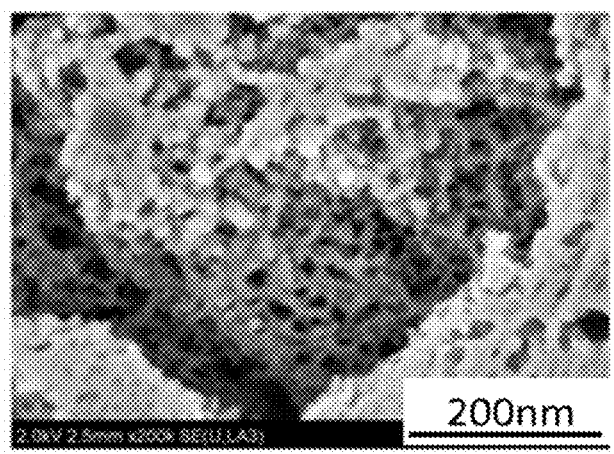
FIG. 2A is a TEM photograph of a catalyst according to an embodiment.
Figure 2B:
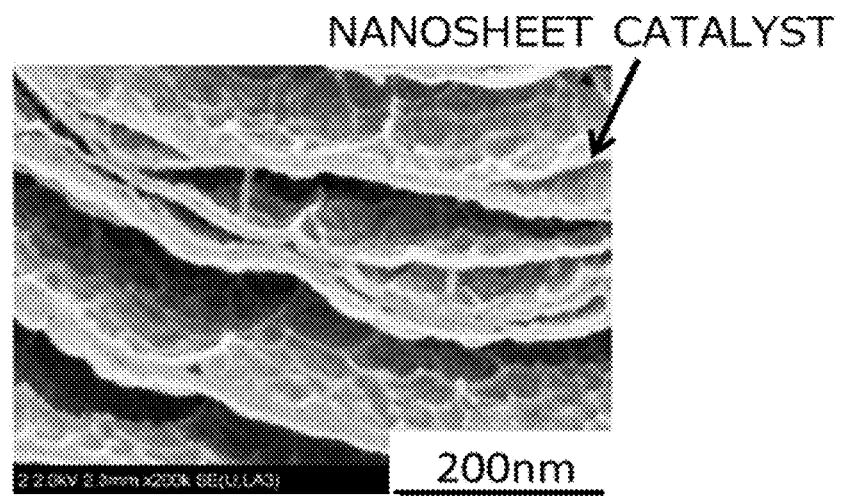
FIG. 2B is a TEM photograph of a catalyst according to an embodiment.

In the case of using a noble metal catalyst, it is possible to maintain high characteristics and high durability of an electrochemical cell even when a small amount of a noble metal catalyst is used. FIGS. 2A and 2B illustrate a catalyst unit having a porous structure and a catalyst unit having a laminated structure including a gap layer, respectively. FIG. 2A illustrates a catalyst unit having a porous structure in which particles having a particle size of typically equal to or less than 10 nm are aggregated. FIG. 2B illustrates a catalyst unit having a laminated structure including a sheet-like catalyst having a thickness of typically equal to or less than 10 nm and a void layer. In the case where a catalyst material is supported on a carrier, a catalyst is generally nano-sized particles. However, a catalyst in a catalyst unit having a porous structure is sponge-like. A catalyst in a catalyst unit having a laminated structure including a gap layer is nanosheet-like (nanosheet catalyst). By using a sponge-like or nanosheet-like catalyst, it is possible to improve characteristics of an electrochemical cell. An electrocatalytic reaction occurs on a catalyst surface, and therefore a catalyst shape affects atomic arrangement and electronic state of the catalyst surface. In a catalyst unit having a laminated structure including a gap layer, adjacent nanosheets are desirably partially integrated. Although a mechanism has not yet been elucidated completely, it is thought that proton conduction or hydrogen atom conduction for electrode reaction can be achieved more smoothly.

Figure 2C:
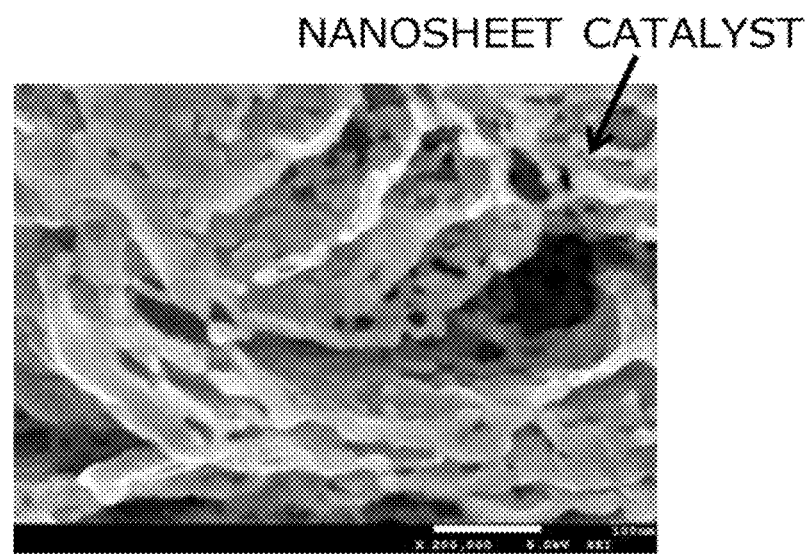
FIG. 2C is a TEM photograph of a catalyst according to an embodiment.
Figure 2D:
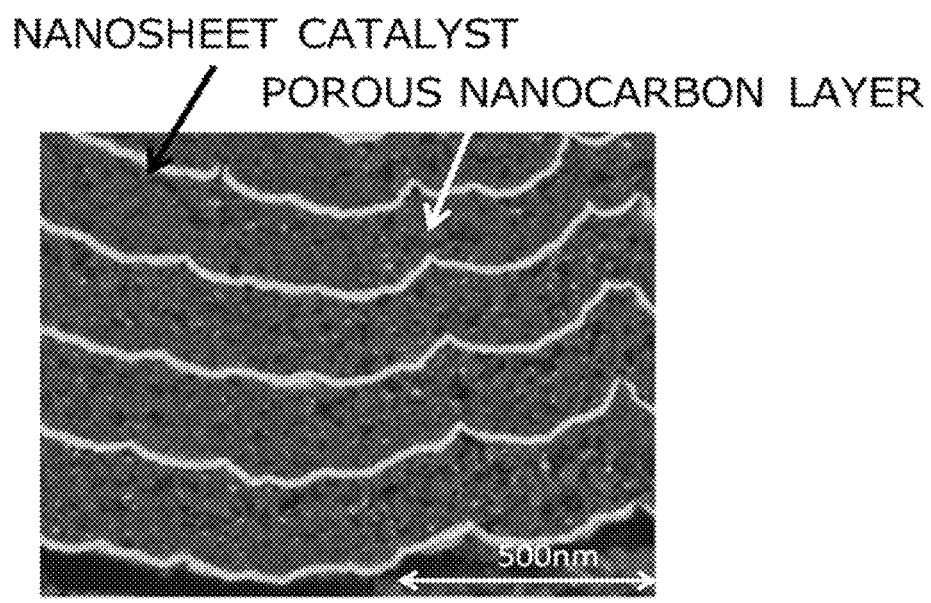
FIG. 2D is a TEM photograph of a catalyst according to an embodiment.

Further, as indicated in FIG. 2C, higher properties can be obtained by making a nanosheet inside the laminated structure porous. This is because gas diffusion and water management can be improved. Durability and robustness can be further improved by disposing a porous nano-carbon layer (FIG. 2D) containing fibrous carbon or a nanoceramic material layer between the nanosheets inside the laminated structure. The catalyst contributing to main electrode reaction is hardly supported by fibrous carbon contained in the porous nano-carbon layer, and therefore a laminated structural unit including the porous nano-carbon layer is considered to be carrierless. Here, since the movement of substances such as discharge of moisture becomes smoother, a porosity of a catalyst layer is preferably 50 to 90 Vol. %. In addition, if the porosity of the catalyst layer is within this range, the substances can be sufficiently moved without lowering the utilization efficiency of a noble metal.

When carbon particles or the like are used as a catalyst carrier, the carbon particles are oxidized to carbon dioxide during water electrolysis, and the catalyst is deteriorated. In the embodiment, by using no carrier as the catalyst, excellent characteristics can be maintained even when water electrolysis is performed.

Figure 3:
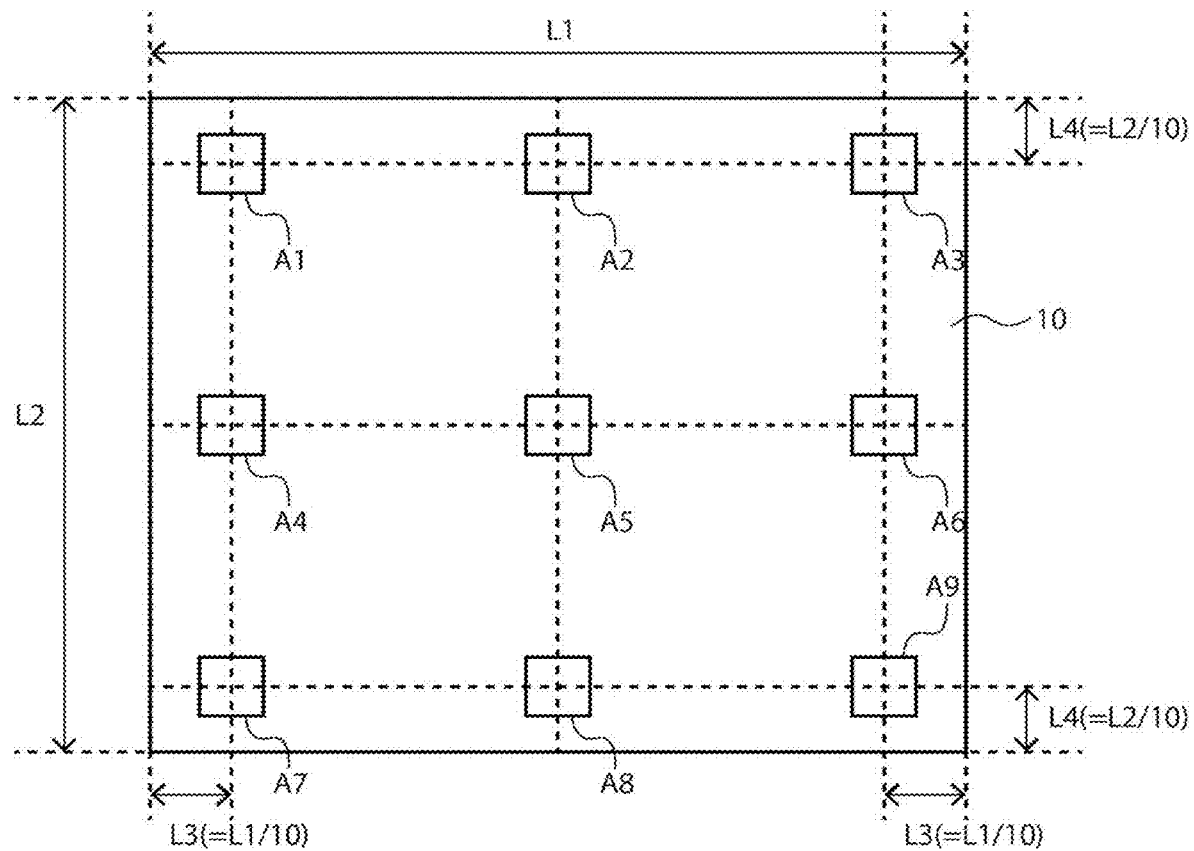
FIG. 3 is a diagram explaining an electrode analysis spot according to an embodiment.

The boundary between the first catalyst layer 2A and the second catalyst layer 2B and the boundary between the second catalyst layer 2B and the third catalyst layer 2C are obtained as follows. First, a composition distribution of the metal element in a cross section of the laminated catalyst 2 is obtained with a scanning electron microscope (Scanning Electron Microscope/Energy Dispersive X-ray Spectroscope; SEM-EDX) equipped with an energy dispersive X-ray spectrometer. FIG. 3 indicates the analysis position. The surface of FIG. 3 is a surface of the laminated catalyst on the substrate 1 side. The positions of nine spots (A1 to A9) in FIG. 3 are analyzed in the depth direction of the laminated catalyst. As illustrated in FIG. 3, when the catalyst length L1 and the catalyst width L2 is (L1≥L2), a virtual line is drawn at a distance of L3 (=L1/10) inward from two sides facing the width direction of the electrode 100, a virtual line is drawn at a distance of L4 (=L2/10) inward from two sides facing the length direction of the electrode 100, further, a virtual line is drawn parallel to the width direction passing through the center of the electrode 100, and a virtual line is drawn parallel to the length direction passing through the center of the electrode 100, regions centered on nine intersections of the virtual lines are set as observation spots A1 to A9.

Figure 4:
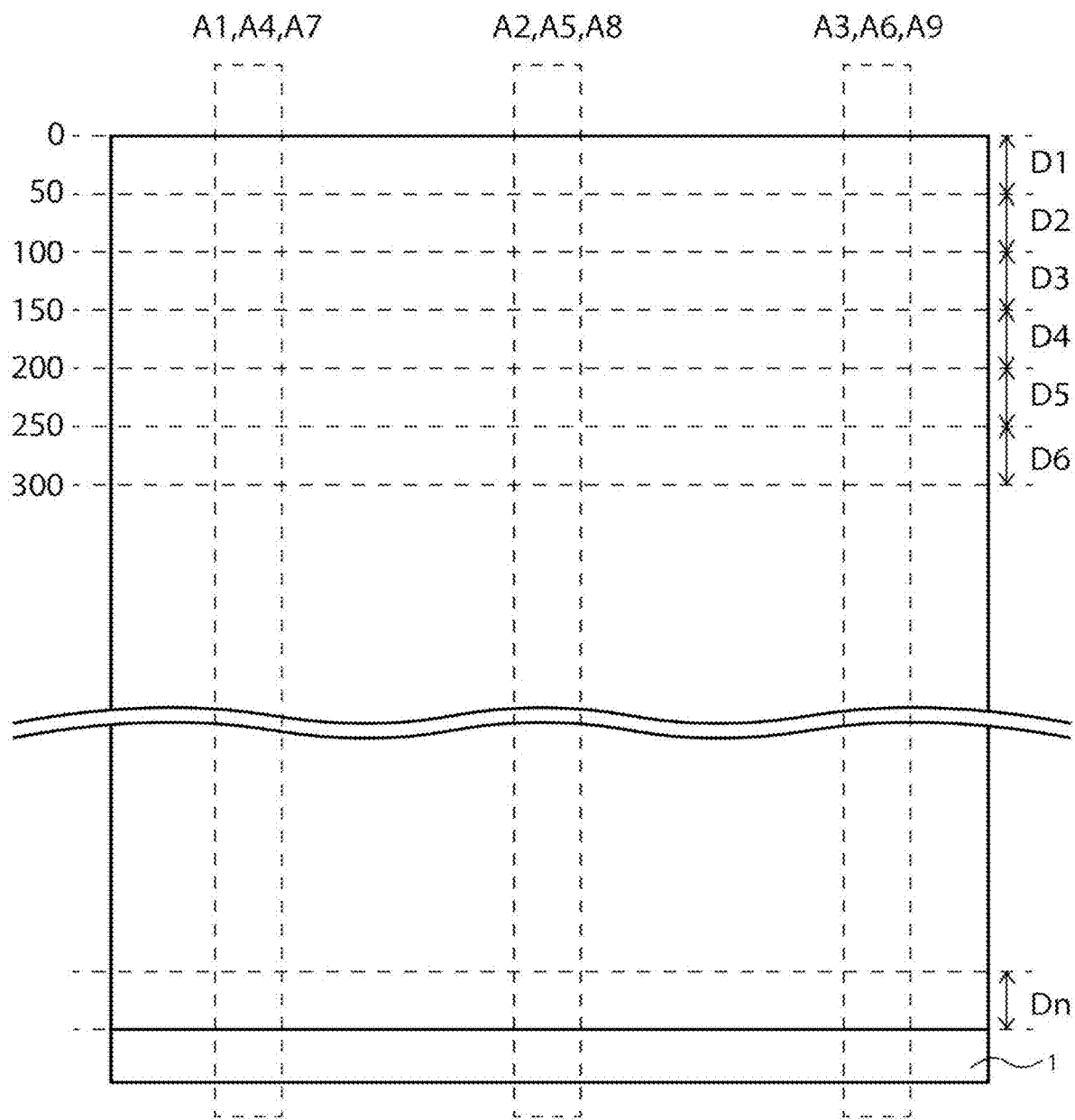
FIG. 4 is a cross-sectional view explaining an analysis position of an electrode according to an embodiment.

In EDX, as illustrated in the cross-sectional view of the laminated catalyst 2 in FIG. 4, the average value of the measured values of a width of 50 nm is used as the ratio of the metal element in the region having the width of 50 nm.

The position at the same depth from a surface at each observation spot is analyzed. In each depth range (D1 to Dn), the ratio of the metal elements A1 to A9 is obtained, and the average value is defined as a ratio of the metal elements in each depth range. The laminated catalyst 2 is not a relatively flat and dense film formed by CVD or the like, but is a porous layer including unevenness of several tens of nm (a region where no catalyst is present). In the case of such a catalyst layer, the interface also has an uneven surface. In order to consider such unevenness, the element concentration in a region having a range in the thickness direction is evaluated. Note that when PTFE (polytetrafluoroethylene) or the like is contained in the laminated catalyst 2, the amount contained in the laminated catalyst 2 is determined by analysis using FT-IR or the like.

Next, the chemical bonding state of the metal element is determined by X-ray photoelectron spectroscopy (XPS), and the ratio of metal, alloy and oxide (compound) is determined. The analysis positions are the same observation spots A1 to A9 as SEM-EDX. The laminated catalyst 2 is analyzed at intervals of 10 nm in the thickness direction, and the ratio of metals, alloys and oxides (compounds) in each depth range (D1 to Dn) is obtained from the average value in the same manner as SEM-EDX. In this way, by correlating the analysis results of SEM-EDX and XPS, the ratio of metal elements in each depth range (D1 to D9) and the state of the metal (the type of metal, alloy, compound and its ratio) is obtained.

Then, all of the laminated catalyst 2 is scraped, and the weight of the laminated catalyst 2 is measured, and then a part of the sample obtained by sufficiently grinding and mixing the scraped laminated catalyst 2 is dissolved, and inductively coupled plasma mass spectrometry (ICP-MS) is performed, to obtain the mass of the entire laminated catalyst 2 and the metal elements in each depth range (D1 to Dn).

The result obtained by the analysis is analyzed to determine the range of the second catalyst layer 2B. For example, from a surface of the laminated catalyst 2 to a depth of 200 nm (D1 to D4), the total amount of the Pt metal and the alloy containing Pt is equal to or more than 90 mass %, and the Pt concentration is equal to or more than 90 atom %, but in a range (D5) from the depth of 200 nm to the depth of 250 nm from the surface, when the total amount of the Pt metal and the alloy containing Pt is equal to or more than 90° by mass, and the Pt concentration does not satisfy equal to or more than 90 atom % and satisfies the above concentration (ratio) condition of the second catalyst layer 2B, the depth of 200 nm from the surface is determined as a boundary between the first catalyst layer 2A and the second catalyst layer 2B. Then, in a range from the depth of 250 nm to the depth of 300 nm from the surface (D6), when the concentration (ratio) of the second catalyst layer is not satisfied, the total amount of Ir oxide, Ru oxide, and composite oxide of Ir and Ru is equal to or more than 90 mass %, and the sum of the concentrations of Ir and Ru satisfies equal to or more than 90 atom %, the depth of 250 nm from the surface is determined as a boundary between the second catalyst layer 2B and the third catalyst layer 2C. Since the overall thickness of the laminated catalyst 2 is determined by observation with SEM-EDX, by determining the position of the second catalyst layer 2B existing in the middle of the laminated catalyst 2, the thicknesses of the first catalyst layer 2A and the third catalyst layer 2C are also determined.

Second Embodiment

Figure 5:
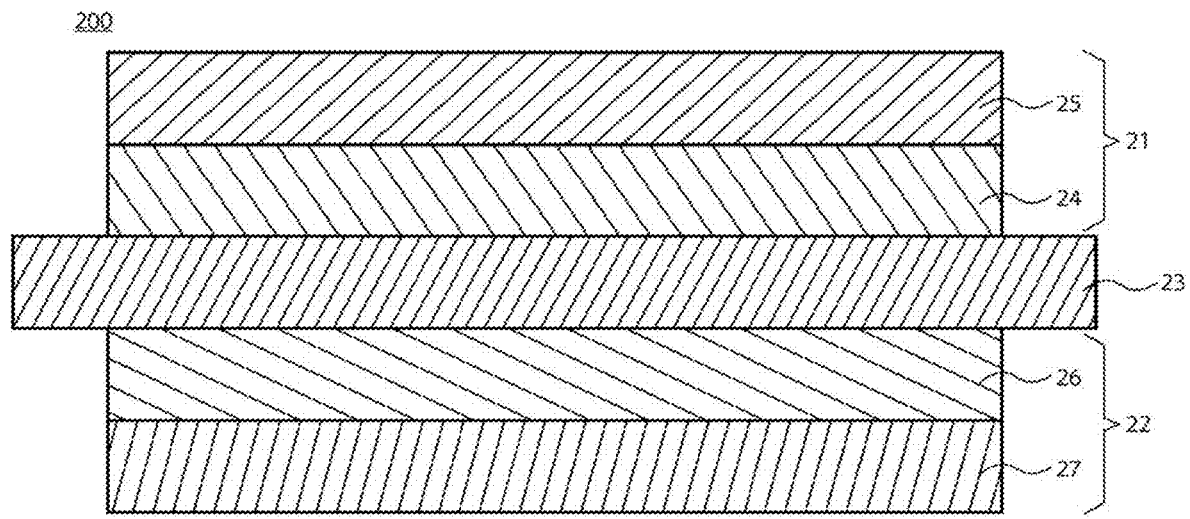
FIG. 5 is a conceptual diagram of a membrane electrode assembly (MEA) according to an embodiment.

A second embodiment relates to a membrane electrode assembly (MEA). FIG. 5 is a cross-sectional view of a MEA200.

The MEA 200 includes a first electrode 21, a second electrode 22, and an electrolyte membrane 23 provided between the first electrode 21 and the second electrode 22. The MEA200 can be used for both the fuel cell and water electrolysis. The electrode 100 of the first embodiment is used for either the first electrode 21 or the second electrode 22. The electrode 100 of the first embodiment may be used for both electrodes. When the electrode 100 of the first embodiment is used for only one electrode, an electrode using Pt particles as a catalyst for the other electrode, for example, an electrode having only the first catalyst layer 2A on the substrate 1 can be used.

The first electrode 21 is adjacent to one surface of the electrolyte membrane 23 and includes a catalyst layer 24 adjacent to the electrolyte membrane 23 and a base material 25 adjacent to the catalyst layer 24.

The second electrode 22 is adjacent to the other surface of the electrolyte membrane 23 and includes a catalyst layer 26 adjacent to the electrolyte membrane 23 and a substrate 27 adjacent to the catalyst layer 26.

The electrolyte membrane 23 is an electrically insulated membrane having good proton conductivity. As the electrolyte membrane having proton conductivity, for example, a fluororesin having a sulfonic acid group (for example, Nafion (trademark manufactured by DuPont), Flemion (trademark manufactured by Asahi Kasei Corporation), Aciplex (trademark manufactured by AGC Inc.), and inorganic substances such as tungstic acid and phosphotungstic acid can be used.

The thickness of the electrolyte membrane 23 can be appropriately determined in consideration of the characteristics of the MEA 200. From the viewpoint of strength, dissolution resistance, and MEA output characteristics, the thickness of the electrolyte membrane 23 is preferably equal to or more than 10 μm and equal to or less than 200 μm. The thickness in the embodiment represents an average thickness in the stacking direction. In the embodiment, the stacking direction represents a direction from the second electrode 22 toward the first electrode 21.

Third Embodiment

Figure 6:
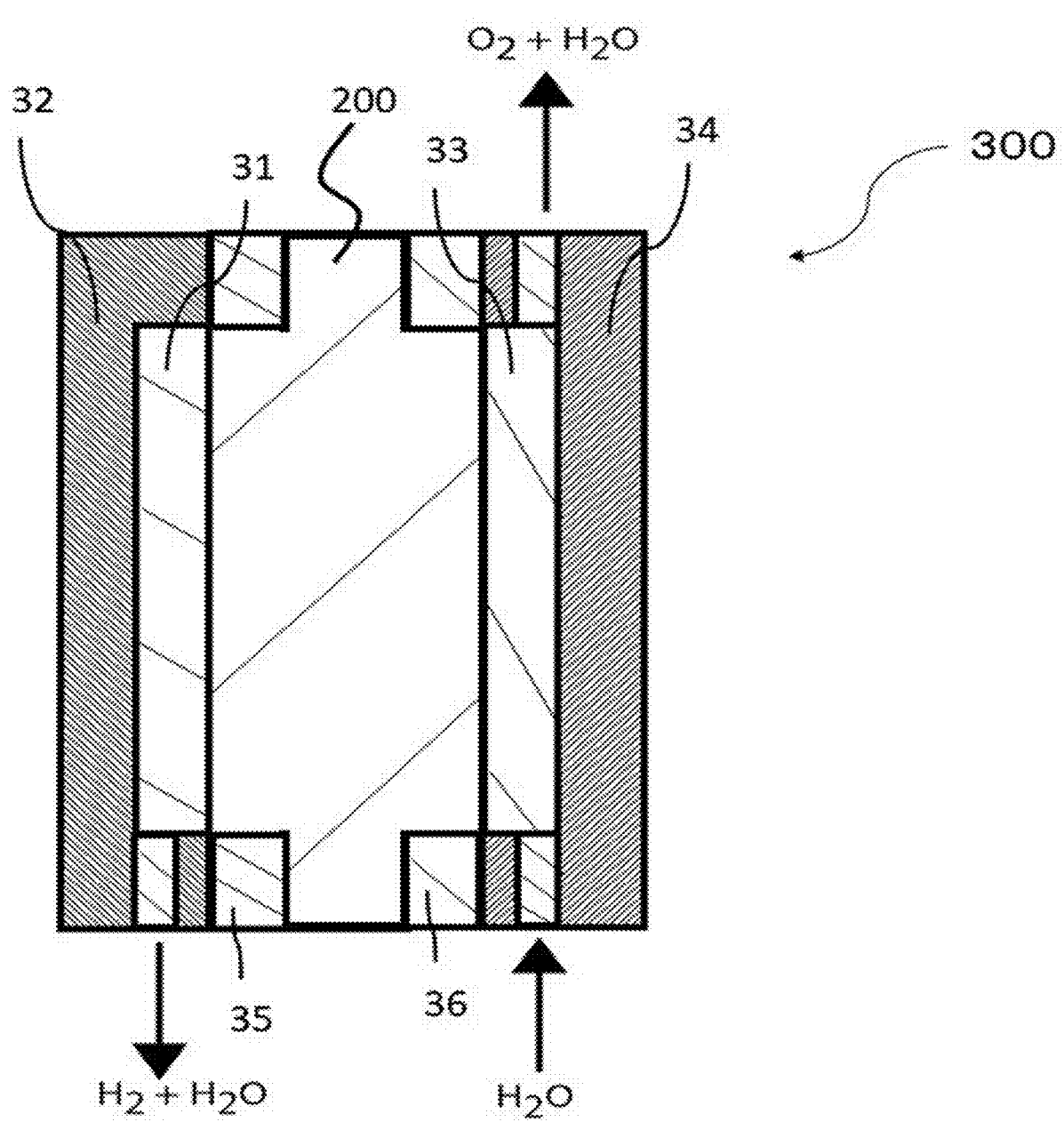
FIG. 6 is a conceptual diagram of a reversible cell of an embodiment.

A third embodiment relates to a fuel cell and water electrolysis reversible cell. The reversible cell has two operation modes, a fuel cell mode and a water electrolysis mode. FIG. 6 is a cross-sectional view of a reversible cell 300 according to the third embodiment. As illustrated in FIG. 6, the reversible cell 300 of the third embodiment includes a MEA 200, a feed conductor 31, a separator 32, a feed conductor 33, a separator 34, a gasket (seal) 35, and a gasket (seal) 36. The feed conductors 31 and 33 may be conductive as long as they pass gas or water. Further, the feed conductors 31 and 33 may be integrated with the separators 32 and 34. Specifically, the feed conductor is, for example, a feed conductor having a flow path through which water or gas flows in a separator and a feed conductor having a porous body, but is not limited to this.

In the reversible cell 300 of FIG. 6, an electrode (not illustrated) is connected to the feed conductor 31 and the feed conductor 33, and a reaction occurs between the cathode and the anode. In the water electrolysis mode, water is supplied to the anode, and water is decomposed into protons, oxygen and electrons at the anode electrode. A support of the electrode and the feed conductor are porous bodies, and this porous body functions as a flow path plate. The generated water and unreacted water are discharged, and protons and electrons are used in a cathode reaction. In the cathode reaction, protons and electrons react to produce hydrogen. The produced hydrogen is used as a fuel for a fuel cell, for example. The MEA 200 is held by the separators 32 and 34, and airtightness is maintained by the gaskets (seals) 35 and 36. The supply of hydrogen and oxygen and the discharge of water are not illustrated, but in the fuel cell mode, oxygen is supplied to the oxygen electrode and produced at the fuel electrode, and the protons that have passed through the electrolyte membrane react to produce water, and electricity is generated by generating protons and electrons when hydrogen is supplied. Hydrogen generated in the water electrolysis mode can be supplied to the fuel electrode. Oxygen or air generated in the water electrolysis mode is supplied to the oxygen electrode.

Fourth Embodiment

Figure 7:
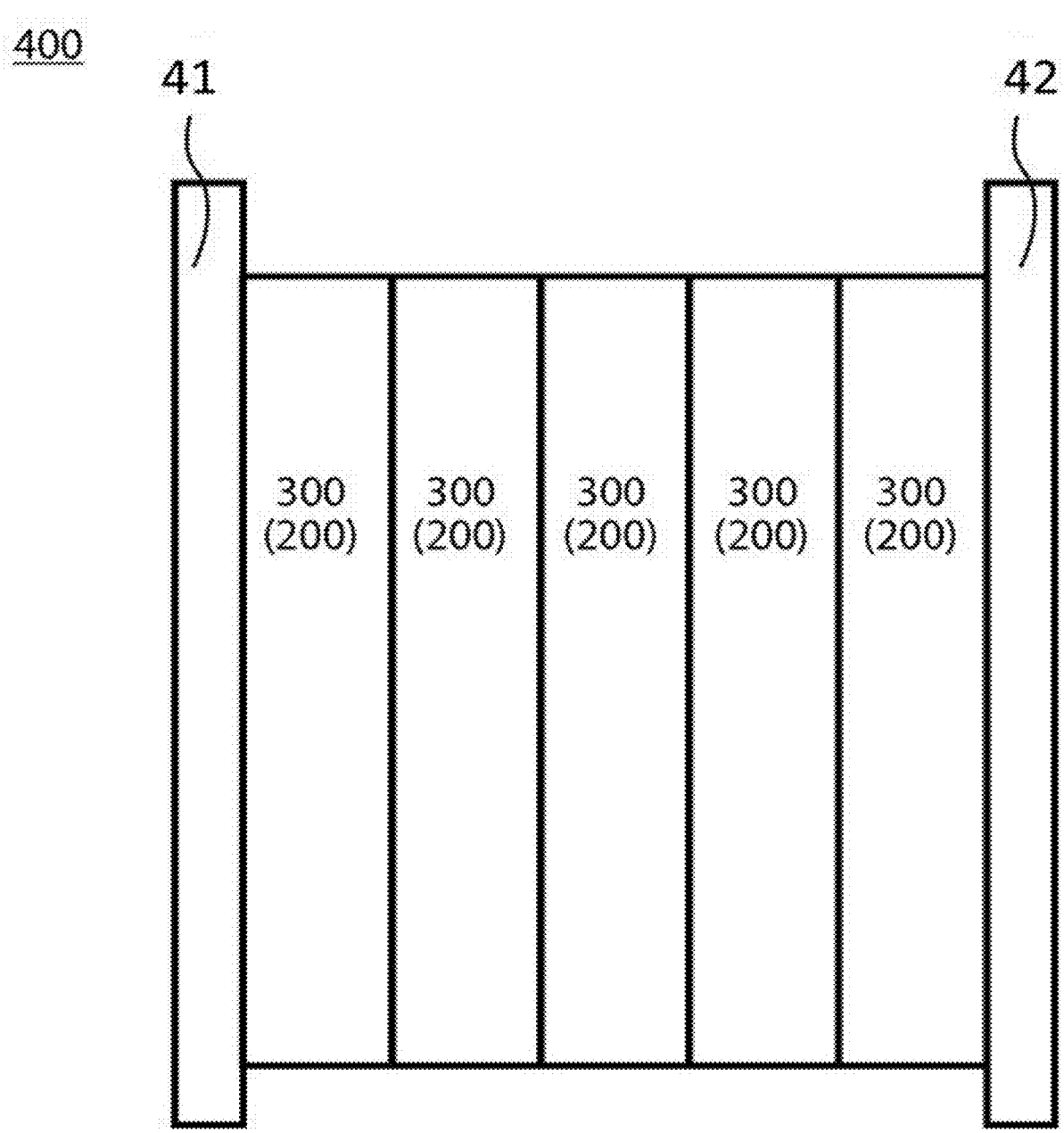
FIG. 7 is a conceptual diagram of a stack of an embodiment.

A fourth embodiment relates to a stack. FIG. 7 illustrates a stack according to the fourth embodiment. A stack 400 of the fourth embodiment illustrated in FIG. 7 is obtained by connecting a plurality of MEA 200 or reversible cells 300 in series. Tightening plates 41 and 42 are attached to both ends of the reversible cells.

In the fuel cell mode, since the voltage from one MEA 200 or reversible cell 300 is low, a high voltage can be obtained by forming the stack 400 in which a plurality of the MEA 200 or reversible cells 300 are connected in series. In the water electrolysis mode, the amount of hydrogen generated in the reversible cell 300 composed of a single MEA 200 is small. Therefore, a large amount of hydrogen can be obtained by forming the stack 400 in which a plurality of the reversible cells 300 are connected in series.

Fifth Embodiment

Figure 8:
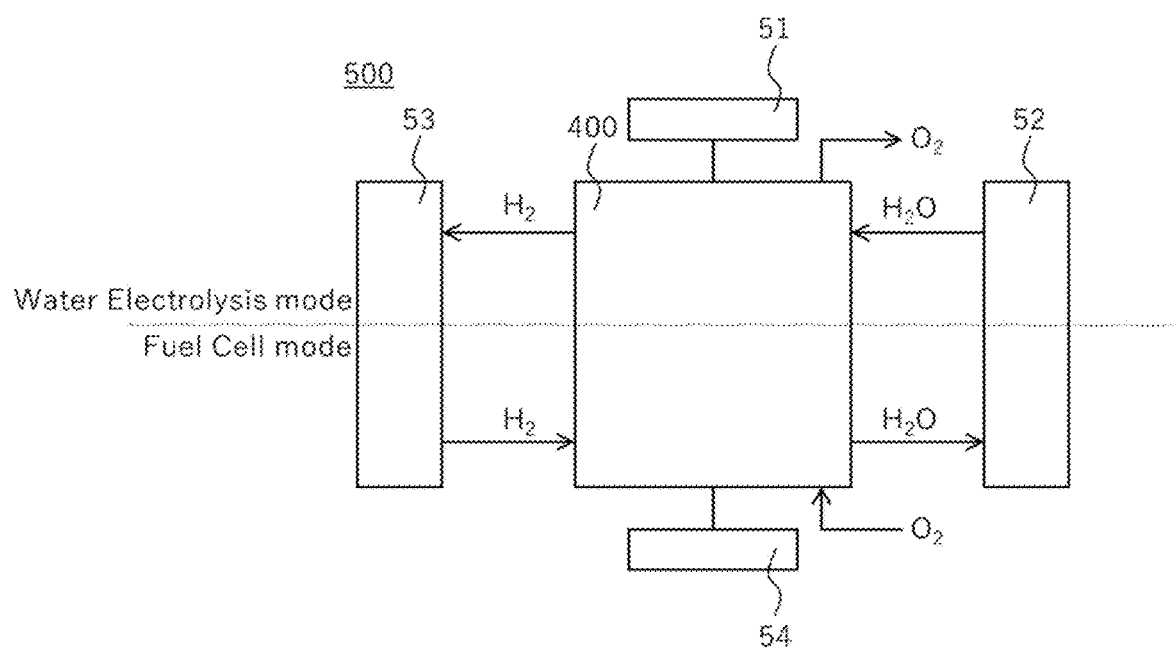
FIG. 8 is a conceptual diagram of a fuel cell and water electrolysis reversible device of an embodiment.

A fifth embodiment relates to a fuel cell and water electrolysis reversible device. FIG. 8 is a view of a fuel cell and water electrolysis reversible device according to the fifth embodiment. In the fifth embodiment, the stack 400 is used in a fuel cell and water electrolysis reversible device 500. The stack 400 is connected to a power source 51, a water tank 52, a hydrogen tank 53, and a load 54. The stack 400 in which the reversible cells 300 are stacked in series is used. In the water electrolysis mode, a voltage is applied between electrodes by the power source 51 of the stack 400. Then, water is supplied to the anode, the water is electrolyzed, oxygen is generated at the anode, and hydrogen is generated at the cathode. The generated hydrogen is stored in the hydrogen tank 53. Then, in the fuel cell mode, hydrogen is supplied from the hydrogen tank 53 to the fuel electrode, hydrogen is supplied to the oxygen electrode, and power is generated by an electrode reaction. Further, the water generated at the oxygen electrode is stored in the water tank 52 and can be used for water electrolysis, or the water may be discarded. The generated power is consumed by the load 54. Electric power generated by sunlight or the like can be stored in a storage battery. However, in situations such as when the storage battery is fully charged, water electrolysis is performed using the power generated by sunlight to convert electrical energy into hydrogen (fuel), and further electricity ca be generated when the hydrogen is needed.

Sixth Embodiment

Figure 9:
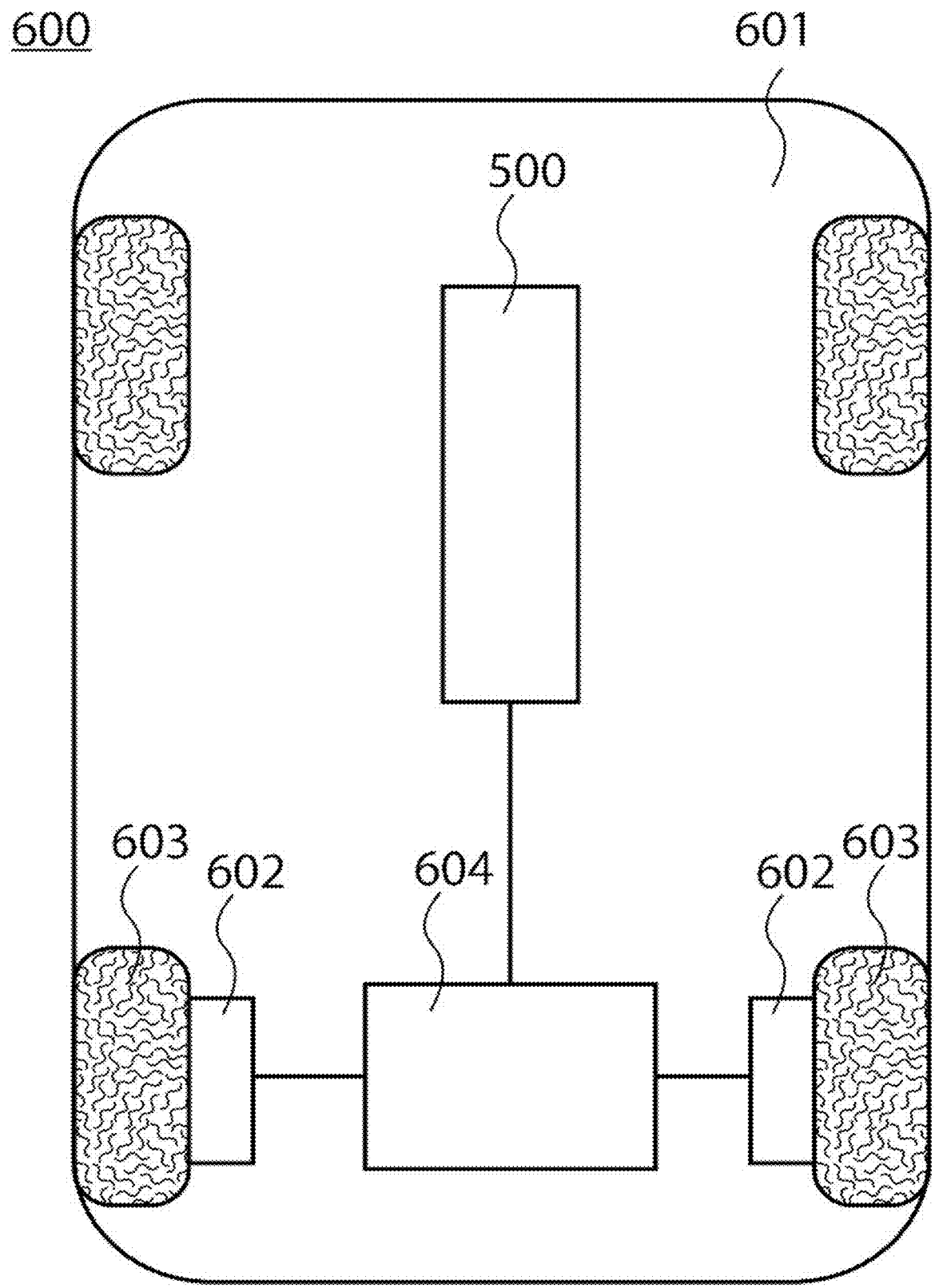
FIG. 9 is a conceptual diagram of a vehicle of an embodiment.

A sixth embodiment relates to a vehicle. The vehicle uses a fuel cell and water electrolysis reversible device 500. The configuration of the vehicle according to the present embodiment will be briefly described with reference to the schematic diagram of a vehicle 600 in FIG. 9. The vehicle 600 includes the fuel cell and water electrolysis reversible device 500, a vehicle body 601, a motor 602, wheels 603, and a control unit 604. The fuel cell and water electrolysis reversible device 500, the motor 602, the wheel 603, and the control unit 604 are disposed in the vehicle body 601. The electrodes of the fuel cell and water electrolysis reversible device 500 are connected to the motor 602 as a load via the load control unit 604. The control unit 604 converts the power output from the fuel cell 500 and adjusts the output. The motor 602 rotates the wheels 603 using the electric power output from the fuel cell 500. By using the electrode 100 of the embodiment, the fuel cell and water electrolysis reversible device 500 of the embodiment can perform both power generation and hydrogen production in both the fuel cell mode and the water electrolysis mode. For example, by performing water electrolysis with electric power generated by a solar cell mounted on the vehicle 600 or electric power generated in the regenerative mode, the vehicle 600 can produce the fuel in the fuel cell mode.

Seventh Embodiment

Figure 10:
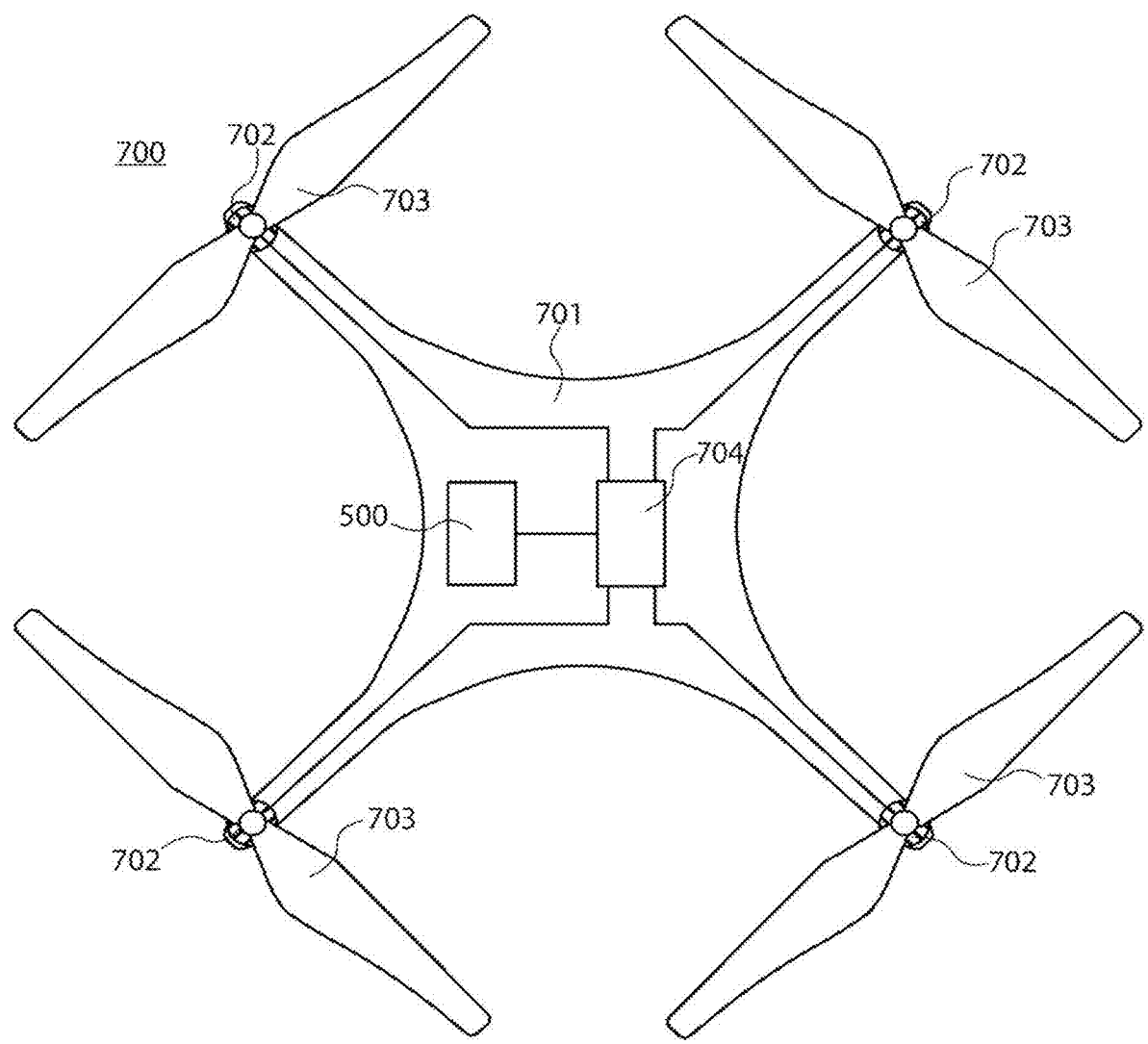
FIG. 10 is a conceptual diagram of a flying object of an embodiment.

A seventh embodiment relates to a flying object (for example, a multicopter). The flying object uses a fuel cell and water electrolysis reversible device 500. The flying object uses a fuel cell and water electrolysis reversible device 500. The configuration of the flying object according to the present embodiment will be briefly described with reference to the schematic diagram of the flying object (quad copter) 700 in FIG. 10. The flying object 700 includes the fuel cell and water electrolysis reversible device 500, an airframe 701, a motor 702, a rotor 703, and a control unit 704. The fuel cell and water electrolysis reversible device 500, the motor 702, the rotor 703, and the control unit 704 are disposed in the airframe 701. The cathode and anode of the fuel cell and water electrolysis reversible device 500 are connected to the motor 702 as a load via the load control unit 704. The control unit 704 converts the power output from the fuel cell and water electrolysis reversible device 500 and adjusts the output. The motor 702 rotates the rotor 703 using the electric power output from the fuel cell and water electrolysis reversible device 500. By using the electrode 100 of the embodiment, the fuel cell and water electrolysis reversible device 500 of the embodiment can perform both power generation and hydrogen production in both the fuel cell mode and the water electrolysis mode. For example, by performing water electrolysis with electric power generated by a solar cell mounted on the flying object 700, the flying object 700 can produce fuel in the fuel cell mode.

Hereinafter, examples and comparative examples will be described.

Example 1

A Ti mesh having a thickness of 200 is prepared as a substrate. Surface treatment is performed on this substrate, and sputtering using Pt, Ni and Co as a target is started in an inert gas atmosphere. After a certain period of time, oxygen gas is mixed, and Ir, Ru, and Ni are used as targets to reactive sputtering. Thereafter, Ni (including oxide) and Co, which are pore-forming agents, are removed with nitric acid to produce a first electrode in which a laminated catalyst having a porous structure is formed on a substrate. Then, sputtering is performed using Pt, Ni and Co as targets in an inert gas atmosphere on a carbon paper Toray060 (Toray Industries, Inc.) having a carbon layer with a thickness of 25 µm as a base material, and a pore-forming agent is removed with nitric acid to produce a second electrode in which a porous structure catalyst is formed on a substrate. The mass of Pt per area of the second electrode is 0.10 mg/cm$^2$. In Example 1, by sputtering the noble metal and the non-noble metal alternately, a catalyst (nanosheet-like laminate) in which the catalyst metal (oxide) and voids are alternately laminated is produced, but it is also possible to produce a catalyst having a porous structure in which particles are aggregated (aggregated particles) by simultaneously sputtering a noble metal and a non-noble metal.

The produced electrode is partially processed so as to be a 5 cm×5 cm square. Then, a MEA for a reversible cell is obtained by sandwiching Nafion 117 (manufactured by DuPont) with a thickness of 127 µm between two electrodes and joining by thermocompression bonding (electrode area is about 16 cm$^2$, thermocompression condition: 120° C. to 200° C., pressure 10 to 200 kg/cm$^2$, 10 seconds to 5 minutes).

The obtained MEA is set between two separators provided with flow paths to produce a reversible cell.

First, the characteristics of water electrolysis are evaluated. For the obtained single cell, the cell temperature was maintained at 80° C., and water is supplied to the positive electrode. A voltage of 1.3 to 2.5 V is applied to the single cell, and the water electrolysis characteristics of the produced single cell are evaluated after about 5 hours for conditioning of MEA.

A voltage is applied to the single cell such that the current density becomes 2.0 A/cm$^2$, and the voltage (V) after 50 hours of continuous water electrolysis is used as a voltage characteristic index of water electrolysis.

Voltage after 50 hours continuous operation 1.9 V A;

1.9 V<voltage after 50 hours continuous operation<2.0 V B;

Voltage after 50 hours continuous operation 2.0 V C;

Further, as for the stability of water electrolysis, the cell voltage is measured while continuously operating at 5 A/cm$^2$, and the stability is evaluated according to the following criteria, with the operation time at the time when it rises to 110° of the initial voltage as the endurance time.

Durability time 2000 hours A;

200 hours<durability time<2000 hours B;

Durability time 200 hours C;

Next, the characteristics of the fuel cell are evaluated. After the produced single cell is installed in an evaluation device equipped with an electronic load device, a cell temperature of 80° C. and fuel (hydrogen, stoichiometric 2, 100° RH) are supplied to the fuel electrode (first electrode) side. Further, an oxidizing agent (oxygen, stoichiometric 10, 100% RH) is supplied to the oxygen electrode (second electrode) side. Next, the electronic load device is set to a constant current mode, and a single cell current is held at 1 A/cm$^2$ for 24 hours to perform conditioning. Cell temperature 80° C., fuel (hydrogen, stoichiometric 2, 100% RH) is supplied to the fuel electrode side, oxidant (air, stoichiometric 2, 100° RH) is supplied to the oxidizer side, and I-V measurement is evaluated. The cell voltage (V0) of the fuel cell when the current density is 1 A/cm$^2$ is used as the voltage characteristic index of the fuel cell.

Voltage after one hour continuous operation 0.58 V A;

0.53 V<Voltage after one hour continuous operation<0.58 V B;

Voltage after one hour continuous operation 0.53 V C;

Regarding the stability of fuel cells, 20,000 potential cycles (rectangular wave: fuel electrode 0.6V, 3 s; oxidation electrode 1.0V, 3 s) are performed for a single cell. After that, the electronic load device is set to a constant current mode such that the current density is 1.0 A/cm$^2$, the voltage (Vf) after one hour of continuous power generation is used as a fuel cell voltage characteristic index, and a voltage fluctuation rate ((V0−Vf)/V0) due to the potential cycle is obtained. The stability is evaluated according to the following criteria.

Voltage degradation rate<10% A;

10%≤voltage degradation rate≤25% B;

Voltage degradation rate>25% C;

Further, Table 1 summarizes the electrodes of Examples 1 to 21 and Comparative Examples 1 to 6. Table 2 summarizes the results of water electrolysis and fuel cell evaluation.

TABLE 1A

| | | | First catalyst layer | |
| --- | --- | --- | --- | --- |
| | Catalyst layer on substrate side | Thickness [nm] | Form Nanosheet-like laminated/Aggregated particles | Pt:Ir:Ru atomic ratio |
| Example 1 | First catalyst layer | 700 | Nanosheet-like laminate | 100:0:0 |
| Example 2 | Third catalyst layer | 500 | Nanosheet-like laminate | 0:100:0 |
| Example 3 | First catalyst layer | 700 | Aggregated particles | 100:0:0 |
| Example 4 | First catalyst layer | 100 | Nanosheet-like laminate | 100:0:0 |
| Example 5 | First catalyst layer | 200 | Nanosheet-like laminate | 100:0:0 |
| Example 6 | First catalyst layer | 1000 | Nanosheet-like laminate | 100:0:0 |
| Example 7 | First catalyst layer | 2000 | Nanosheet-like laminate | 100:0:0 |
| Example 8 | First catalyst layer | 2300 | Nanosheet-like laminate | 100:0:0 |
| Example 9 | First catalyst layer | 700 | Nanosheet-like laminate | 100:0:0 |
| Example 10 | First catalyst layer | 700 | Nanosheet-like laminate | 100:0:0 |
| Example 11 | First catalyst layer | 700 | Nanosheet-like laminate | 100:0:0 |
| Example 12 | First catalyst layer | 700 | Nanosheet-like laminate | 100:0:0 |
| Example 13 | First catalyst layer | 700 | Nanosheet-like laminate | 100:0:0 |
| Example 14 | First catalyst layer | 700 | Nanosheet-like laminate | 100:0:0 |
| Example 15 | First catalyst layer | 700 | Nanosheet-like laminate | 100:0:0 |
| Example 16 | First catalyst layer | 700 | Nanosheet-like laminate | 100:0:0 |
| Example 17 | First catalyst layer | 700 | Nanosheet-like laminate | 100:0:0 |
| Example 18 | First catalyst layer | 650 | Nanosheet-like laminate | 100:0:0 |
| Example 19 | First catalyst layer | 600 | Nanosheet-like laminate | 100:0:0 |
| Example 20 | First catalyst layer | 500 | Nanosheet-like laminate | 100:0:0 |

TABLE 1A-continued

| | Catalyst layer on substrate side | First catalyst layer | | |
|---|---|---|---|---|
| | | Thickness [nm] | Form Nanosheet-like laminated/Aggregated particles | Pt:Ir:Ru atomic ratio |
| Example 21 | First catalyst layer | 700 | Nanosheet-like laminate | 100:0:0 |
| Comparative Example 1 | — | 700 | Nanosheet-like laminate | 100:0:0 |
| Comparative Example 2 | — | — | — | — |
| Comparative Example 3 | — | — | — | — |
| Comparative Example 4 | First catalyst layer | 700 | Nanosheet-like laminate | 100:0:0 |
| Comparative Example 5 | First catalyst layer | 650 | Nanosheet-like laminate | 100:0:0 |
| Comparative Example 6 | Second catalyst layer | — | — | — |

TABLE 1B

| | Second catalyst layer | | |
|---|---|---|---|
| | Thickness [nm] | Form Nanosheet-like laminated/Aggregated particles | Pt:Ir:Ru atomic ratio |
| Example 1 | 50 | Nanosheet-like laminate | 50:50:0 |
| Example 2 | 50 | Nanosheet-like laminate | 50:50:0 |
| Example 3 | 50 | Aggregated particles | 50:50:0 |
| Example 4 | 50 | Nanosheet-like laminate | 50:50:0 |
| Example 5 | 50 | Nanosheet-like laminate | 50:50:0 |
| Example 6 | 50 | Nanosheet-like laminate | 50:50:0 |
| Example 7 | 50 | Nanosheet-like laminate | 50:50:0 |
| Example 8 | 50 | Nanosheet-like laminate | 50:50:0 |
| Example 9 | 50 | Nanosheet-like laminate | 50:50:0 |
| Example 10 | 50 | Nanosheet-like laminate | 50:50:0 |
| Example 11 | 50 | Nanosheet-like laminate | 50:50:0 |
| Example 12 | 50 | Nanosheet-like laminate | 50:50:0 |
| Example 13 | 50 | Nanosheet-like laminate | 50:50:0 |
| Example 14 | 50 | Aggregated particles | 50:50:0 |
| Example 15 | 4 | Nanosheet-like laminate | 50:50:0 |
| Example 16 | 10 | Nanosheet-like laminate | 50:50:0 |
| Example 17 | 50 | Nanosheet-like laminate | 50:50:0 |
| Example 18 | 100 | Nanosheet-like laminate | 50:50:0 |
| Example 19 | 200 | Nanosheet-like laminate | 50:50:0 |
| Example 20 | 300 | Nanosheet-like laminate | 50:50:0 |
| Example 21 | 50 | Nanosheet-like laminate | 50:35:15 |
| Comparative Example 1 | — | — | — |
| Comparative Example 2 | 500 | Nanosheet-like laminate | 50:50:0 |
| Comparative Example 3 | — | — | — |
| Comparative Example 4 | — | — | — |
| Comparative Example 5 | 100 | Nanosheet-like laminate | 50:50:0 |
| Comparative Example 6 | 100 | Nanosheet-like laminate | 50:50:0 |

TABLE 1C

| | Third catalyst layer | | |
|---|---|---|---|
| | Thickness [nm] | Form Nanosheet-like laminated/Aggregated particles | Pt:Ir:Ru atomic ratio |
| Example 1 | 500 | Nanosheet-like laminate | 0:100:0 |
| Example 2 | 700 | Nanosheet-like laminate | 100:0:0 |
| Example 3 | 500 | Aggregated particles | 0:100:0 |
| Example 4 | 500 | Nanosheet-like laminate | 0:100:0 |
| Example 5 | 500 | Nanosheet-like laminate | 0:100:0 |
| Example 6 | 500 | Nanosheet-like laminate | 0:100:0 |
| Example 7 | 500 | Nanosheet-like laminate | 0:100:0 |
| Example 8 | 500 | Nanosheet-like laminate | 0:100:0 |
| Example 9 | 100 | Nanosheet-like laminate | 0:100:0 |
| Example 10 | 200 | Nanosheet-like laminate | 0:100:0 |
| Example 11 | 1000 | Nanosheet-like laminate | 0:100:0 |
| Example 12 | 2000 | Nanosheet-like laminate | 0:100:0 |
| Example 13 | 2100 | Nanosheet-like laminate | 0:100:0 |
| Example 14 | 500 | Aggregated particles | 0:100:0 |
| Example 15 | 500 | Nanosheet-like laminate | 0:100:0 |
| Example 16 | 500 | Nanosheet-like laminate | 0:100:0 |
| Example 17 | 500 | Nanosheet-like laminate | 0:100:0 |
| Example 18 | 450 | Nanosheet-like laminate | 0:100:0 |
| Example 19 | 400 | Nanosheet-like laminate | 0:100:0 |
| Example 20 | 300 | Nanosheet-like laminate | 0:100:0 |
| Example 21 | 500 | Nanosheet-like laminate | 0:70:30 |
| Comparative Example 1 | — | — | — |
| Comparative Example 2 | — | — | — |
| Comparative Example 3 | 500 | Nanosheet-like laminate | 0:100:0 |
| Comparative Example 4 | 500 | Nanosheet-like laminate | 0:100:0 |
| Comparative Example 5 | — | — | — |
| Comparative Example 6 | 500 | Nanosheet-like laminate | 0:100:0 |

TABLE 2

| | Water electrolysis | | Fuel cell | |
|---|---|---|---|---|
| | Voltage after one hour continuous operation | Stability | Voltage after one hour continuous operation | Stability |
| Example 1 | A | A | A | A |
| Example 2 | A | A | A | A |
| Example 3 | A | A | A | A |
| Example 4 | A | A | B | B |

TABLE 2-continued

|  | Water electrolysis | | Fuel cell | |
| --- | --- | --- | --- | --- |
|  | Voltage after one hour continuous operation | Stability | Voltage after one hour continuous operation | Stability |
| Example 5 | A | A | A | A |
| Example 6 | A | A | A | A |
| Example 7 | A | A | A | A |
| Example 8 | B | B | A | A |
| Example 9 | B | B | A | A |
| Example 10 | A | A | A | A |
| Example 11 | A | A | A | A |
| Example 12 | A | A | A | A |
| Example 13 | A | A | B | B |
| Example 14 | A | A | A | A |
| Example 15 | A | A | A | A |
| Example 16 | A | A | A | A |
| Example 17 | A | A | A | A |
| Example 18 | A | A | A | A |
| Example 19 | A | A | A | A |
| Example 20 | B | B | B | B |
| Example 21 | A | A | A | A |
| Comparative Example 1 | C | C | A | A |
| Comparative Example 2 | C | C | C | C |
| Comparative Example 3 | A | A | C | C |
| Comparative Example 4 | C | C | C | C |
| Comparative Example 5 | C | C | A | A |
| Comparative Example 6 | A | A | C | C |

In Examples 1 to 21, the characteristics and stability of water electrolysis and the fuel cell are all equal to or higher than B, and it can be seen that it is excellent as a fuel cell and water electrolysis reversible device.

Examples 1 and 2

In both cases where the first catalyst layer is on the substrate side and where the third catalyst layer is on the substrate side, the characteristics and stability of water electrolysis and the fuel cell are all equal to or higher than A, and it can be seen that it is excellent as a fuel cell and water electrolysis reversible device.

Example 3

Even when the first catalyst layer, the second catalyst layer, and the third catalyst layer are agglomerated particles, the characteristics and stability of water electrolysis and the fuel cell are all equal to or higher than A, and it can be seen that it is excellent as a fuel cell and water electrolysis reversible device.

Examples 1, and 4 to 8

When the thickness of the first catalyst layer is 200 nm to 2000 nm, the characteristics and stability of water electrolysis and fuel cells are all equal to or higher than A, and it can be seen that it is excellent as a fuel cell and water electrolysis reversible device. When the thickness of the first catalyst layer is 100 nm, the characteristics and stability as a fuel cell are B, but it can be seen that it is excellent as a fuel cell and water electrolysis reversible device as compared with the comparative example. When the thickness of the first catalyst layer is 2300 nm, the characteristics and stability as water electrolysis are B, but it can be seen that it is excellent as a fuel cell and water electrolysis reversible device as compared with the comparative example. In particular, when the thickness of the first catalyst layer is 200 nm to 2000 nm, it is considered that supplying oxygen and discharging water were performed smoothly.

Examples 1, and 9 to 13

When the thickness of the third catalyst layer is 200 nm to 2000 nm, the characteristics and stability of water electrolysis and fuel cells are all equal to or higher than A, and it can be seen that it is excellent as a fuel cell and water electrolysis reversible device. When the thickness of the third catalyst layer is 100 nm, the characteristics and stability as water electrolysis are B, but it can be seen that it is excellent as a fuel cell and water electrolysis reversible device as compared with the comparative example. When the thickness of the third catalyst layer is 2300 nm, the characteristics and stability as a fuel cell are B, but it can be seen that it is excellent as a fuel cell and water electrolysis reversible device as compared with the comparative example. The characteristics and stability as a fuel cell are B, but it can be seen that it is excellent as a fuel cell and water electrolysis reversible device as compared with the comparative example. In particular, when the thickness of the third catalyst layer is 200 nm to 2000 nm, it is considered that water supply and oxygen discharge were performed smoothly.

Example 14

When the first catalyst layer is a nanosheet-like laminate, and the second catalyst layer and the third catalyst layer are aggregated particles, the characteristics and stability of water electrolysis and fuel cells are all equal to or higher than A, and it can be seen that it is excellent as a fuel cell and water electrolysis reversible device.

Examples 1, and 15 to 20

When the thickness of the second catalyst layer is 4 nm to 200 nm, the characteristics and stability of water electrolysis and fuel cells are all equal to or higher than A, and it can be seen that it is excellent as a fuel cell and water electrolysis reversible device. When the thickness of the second catalyst layer is 300 nm, the characteristics and stability of water electrolysis and the fuel cell are all equal to or higher than B, and it can be seen that it is excellent as a fuel cell and water electrolysis reversible device as compared with the comparative example. When the thickness of the second catalyst layer is 4 nm to 200 nm, by including both metal-based and oxide-based, a complex network that is effective in oxygen supply/discharge and water supply/discharge to/from the catalyst is formed. When the thickness of the second catalyst layer is 300 nm, by including both metal-based and oxide-based, a complex network effective for oxygen supply/discharge and water supply/discharge to/from the catalyst was formed, but it is considered that the thickness of the second catalyst layer was slightly thick, and the performance of the fuel cell and water electrolysis per volume was slightly lowered.

Examples 1 and 21

Even if both Ir and Ru are present in the third catalyst layer, the characteristics and stability of water electrolysis and the fuel cell are all equal to or higher than A, and it can be seen that it is excellent as a fuel cell and water electrolysis reversible device.

Here, some elements are expressed only by element symbols thereof.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A laminated catalyst comprising: a first catalyst layer including Pt metal and/or an alloy containing Pt;
    a second catalyst layer containing Pt metal and/or an alloy containing Pt and a metal oxide containing Ir and Ru; and
    a third catalyst layer containing a metal oxide containing Ir and Ru, wherein
    the first catalyst layer, the second catalyst layer, and the third catalyst layer are laminated in order,
    in the first catalyst layer, a total amount of Pt metal and an alloy containing Pt is equal to or more than 90% by mass,
    a concentration of Pt with respect to a sum of concentrations of Pt, Ir, and Ru contained in the first catalyst layer is equal to or more than 90 atom %,
    in the second catalyst layer, a total amount of Pt metal, an alloy containing Pt, Ir oxide, Ru oxide, a composite oxide of Ir and Ru is equal to or more than 90% by mass,
    a concentration of Pt with respect to a sum of concentrations of Pt, Ir, and Ru contained in the second catalyst layer is less than 90 atom %,
    a sum of concentrations of Ir and Ru with respect to a sum of concentrations of Pt, Ir, and Ru contained in the second catalyst layer is less than 90 atom %,
    in the third catalyst layer, a total amount of Ir oxide, Ru oxide, composite oxide of Ir and Ru is equal to or more than 90% by mass,
    a sum of concentrations of Ir and Ru with respect to a sum of concentrations of Pt, Ir, and Ru contained in the third catalyst layer, Ir, and Ru is equal to or more than 90 atom %,
    the first catalyst layer has a porous structure in which a sheet-like carrierless noble metal catalyst layer containing Pt and a void layer are laminated, and/or a porous structure in which carrierless particles of a noble metal containing Pt are aggregated,
    the second catalyst layer has a porous structure in which a sheet-like carrierless noble metal catalyst layer containing Pt and a void layer are laminated, and/or a porous structure in which carrierless particles of a noble metal containing Pt are aggregated, and a porous structure in which a carrierless noble metal catalyst layer that is a sheet-like oxide containing Ir and Ru and a void layer are laminated, and/or a porous structure in which carrierless particles of noble metal oxides containing Ir and Ru are aggregated,
    the third catalyst layer has a porous structure in which a carrierless noble metal catalyst layer that is a sheet-like oxide containing Ir and Ru and a void layer are laminated, and/or a porous structure in which carrierless particles that is a noble metal oxide containing Ir and Ru are aggregated,
    the first catalyst layer is in direct contact with the second catalyst layer, and
    the second catalyst layer is in direct contact with the third catalyst layer.

2. The catalyst according to claim 1, wherein
    the first catalyst layer has a thickness of equal to or more than 100 nm,
    the second catalyst layer has a thickness of equal to or more than 4 nm, and
    the third catalyst layer has a thickness of equal to or more than 100 nm.

3. The catalyst according to claim 1, wherein
    in the first catalyst layer, a total amount of Pt metal and an alloy containing Pt is equal to or more than 90% by mass,
    the first catalyst layer includes at least one metal selected from the group consisting of Co, Ni, Fe, Mn, Ta, W, Hf, Si, Mo, Ti, Zr, Nb, V, Cr, Al, and Sn,
    in the second catalyst layer, a total amount of a Pt metal, an alloy containing Pt, an Ir oxide, an Ru oxide, and a composite oxide of Ir and Ru is equal to or more than 90% by mass,
    the second catalyst layer includes at least one metal selected from the group consisting of Co, Ni, Fe, Mn, Ta, W, Hf, Si, Mo, Ti, Zr, Nb, V, Cr, Al, and Sn,
    the second catalyst layer further includes at least one metal oxide selected from the group consisting of Rh, Au, Ta, W, Si, Ti, Zr, Sn, Pt, Pd, Hf, V, Mo, Cr, Co, Ni, Nb, Fe, Mn, Al, and Zn,
    in the third catalyst layer, a total amount of an Ir oxide, an Ru oxide, a composite oxide of Ir and Ru is equal to or more than 90% by mass, and
    the third catalyst layer further includes at least one metal oxide selected from the group consisting of Rh, Au, Ta, W, Si, Ti, Zr, Sn, Pt, Pd, Hf, V, Mo, Cr, Co, Ni, Nb, Fe, Mn, Al, and Zn.

4. The catalyst according to claim 1, wherein
    in the first catalyst layer, a total amount of Pt metal and an alloy containing Pt is equal to or more than 90% by mass,
    the alloy containing Pt in the first catalyst layer is Pt and at least one metal selected from the group consisting of Co, Ni, Fe, Mn, Ta, W, Hf, Si, Mo, Ti, Zr, Nb, V, Cr, Al, and Sn,
    in the second catalyst layer, a total amount of a Pt metal, an alloy containing Pt, an Ir oxide, an Ru oxide, and a composite oxide of Ir and Ru is equal to or more than 90% by mass,
    the alloy containing Pt in the second catalyst layer is Pt and at least one metal selected from the group consisting of Co, Ni, Fe, Mn, Ta, W, Hf, Si, Mo, Ti, Zr, Nb, V, Cr, Al, and Sn,
    the second catalyst layer further includes a composite oxide of Ir or/and Ru and at least one metal selected from the group consisting of Rh, Au, Ta, W, Si, Ti, Zr, Sn, Pt, Pd, Hf, V, Mo, Cr, Co, Ni, Nb, Fe, Mn, Al, and Zn,
    in the third catalyst layer, a total amount of an Ir oxide, an Ru oxide, a composite oxide of Ir and Ru is equal to or more than 90% by mass, and
    the third catalyst layer further includes a composite oxide of Ir or/and Ru and at least one metal selected from the group consisting of Rh, Au, Ta, W, Si, Ti, Zr, Sn, Pt, Pd, Hf, V, Mo, Cr, Co, Ni, Nb, Fe, Mn, Al, and Zn.

5. The catalyst according to claim 1, wherein
the first catalyst layer has a thickness of equal to or more than 200 nm and equal to or less than 2000 nm,
the second catalyst layer has a thickness of equal to or more than 4 nm and equal to or less than 200 nm, and
the third catalyst layer has a thickness of equal to or more than 200 nm and equal to or less than 2000 nm.

6. The catalyst according to claim 1, wherein
a surface of the first catalyst layer facing the second catalyst layer is in direct contact with a surface of the second catalyst layer facing the first catalyst layer, and
a surface of the second catalyst layer facing the third catalyst layer is in direct contact with a surface of the third catalyst layer facing the second catalyst layer.

7. The catalyst according to claim 1, wherein
when the thickness of the first catalyst layer is $T_A$, the thickness of the second catalyst layer is $T_B$, and the thickness of the third catalyst layer is $T_C$,
$T_A$, $T_B$, and $T_C$ satisfy a relationship of $1/300 \leq (T_B/(T_A+T_C)) \leq 1/5$.

8. The catalyst according to claim 1, wherein
when the thickness of the first catalyst layer is $T_A$, and the thickness of the third catalyst layer is $T_C$,
$T_A$ and $T_C$ satisfy a relationship of $1/5 \leq (T_A/T_C) \leq 5$.

9. An electrode using the laminated catalyst according to claim 1, and a substrate.

10. The electrode according to claim 9, wherein a first catalyst layer or a third catalyst layer is located on the substrate side.

11. The electrode according to claim 9, wherein the first catalyst layer or the third catalyst layer is in direct contact with the substrate.

12. A membrane electrode assembly using the electrode according to claim 9.

13. An electrochemical cell using the membrane electrode assembly according to claim 12.

14. A stack using the membrane electrode assembly according to claim 12.

15. A fuel cell and water electrolysis reversible device using the membrane electrode assembly according to claim 12.

16. A vehicle using the fuel cell and water electrolysis reversible device according to claim 15.

17. A flying object using the fuel cell and water electrolysis reversible device according to claim 15.

18. The electrode according to claim 1, wherein the first catalyst layer has a porous structure in which a sheet-like carrierless noble metal catalyst layers containing Pt and void layers are laminated alternately.

* * * * *